United States Patent
Cudak et al.

(10) Patent No.: US 9,958,927 B2
(45) Date of Patent: May 1, 2018

(54) SELECTING ACTIVE POWER SUPPLIES BASED ON POWER SUPPLY CABLE LENGTH

(71) Applicant: Lenovo Enterprise Solutions (Singapore) Pte. Ltd., Singapore (SG)

(72) Inventors: Gary D. Cudak, Wake Forest, NC (US); Luke D. Remis, Raleigh, NC (US); Brian C. Totten, Durham, NC (US); Michael DeCesaris, Carrboro, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 68 days.

(21) Appl. No.: 14/728,306

(22) Filed: Jun. 2, 2015

(65) Prior Publication Data

US 2016/0357244 A1 Dec. 8, 2016

(51) Int. Cl.
*G06F 1/32* (2006.01)

(52) U.S. Cl.
CPC .................. *G06F 1/3234* (2013.01)

(58) Field of Classification Search
CPC .................................... G06F 1/3234
USPC ............................................. 713/323
See application file for complete search history.

(56) References Cited

U.S. PATENT DOCUMENTS

| | | | | |
|---|---|---|---|---|
| 6,055,647 A * | 4/2000 | Lacombe | ............ | G06F 11/2015 714/14 |
| 6,064,621 A * | 5/2000 | Tanizaki | ................ | G11C 5/025 365/189.09 |
| 6,160,820 A * | 12/2000 | Isaksson | ............... | H04L 5/0007 370/294 |
| 2003/0004686 A1 | 1/2003 | Ueno et al. | | |
| 2003/0058726 A1* | 3/2003 | Ishida | ....................... | G11C 5/14 365/226 |
| 2009/0304059 A1* | 12/2009 | Bishop | .................... | H04L 25/24 375/222 |
| 2010/0194189 A1* | 8/2010 | Tajima | ...................... | H02J 3/00 307/1 |
| 2012/0013186 A1 | 1/2012 | Sarti | | |
| 2012/0131360 A1* | 5/2012 | Zyren | ..................... | H04L 12/10 713/310 |
| 2012/0155328 A1* | 6/2012 | Saulsbury | ............... | H04L 12/12 370/255 |
| 2012/0246491 A1* | 9/2012 | Dain | ....................... | G06F 1/263 713/300 |
| 2013/0204558 A1 | 8/2013 | Huang et al. | | |
| 2013/0297238 A1 | 11/2013 | Kamiya | | |

(Continued)

*Primary Examiner* — Robert Cassity
*Assistant Examiner* — Chad Erdman
(74) *Attorney, Agent, or Firm* — Jeffrey L. Streets

(57) ABSTRACT

A method includes identifying a plurality of power supplies connected for supplying power to a computer system, wherein the plurality of power supplies includes at least one redundant power supply in a standby mode. For each of the plurality of power supplies identified, the method determines a length of a power supply cable connected between the power supply and a power distribution unit for supplying power to the power supply. The method further includes placing one or more of the plurality of power supplies in an active mode in ascending order of the length of the cable connected to the power supply, and supplying power to the computer system using the one or more of the plurality of power supplies in the active mode.

20 Claims, 5 Drawing Sheets

(56) References Cited

U.S. PATENT DOCUMENTS

| | | | |
|---|---|---|---|
| 2014/0097682 A1 | 4/2014 | Lin | |
| 2014/0111908 A1 | 4/2014 | Ewing | |
| 2014/0136863 A1 | 5/2014 | Fritchman | |
| 2014/0331068 A1* | 11/2014 | Cao | G06F 1/3203 713/323 |
| 2015/0120874 A1* | 4/2015 | Kim | H04L 67/1097 709/218 |
| 2015/0214779 A1* | 7/2015 | Tomassi | H02J 9/061 307/65 |
| 2015/0270700 A1* | 9/2015 | Tang | H02H 7/1213 361/92 |
| 2016/0124477 A1* | 5/2016 | Guy | H04L 12/10 713/300 |
| 2016/0233665 A1* | 8/2016 | Kitchener | G05B 19/042 |

* cited by examiner

| Computer System | Configuration | Power Supply ID | Cable Length (meters) | Power Supply Mode |
|---|---|---|---|---|
| A | N+N | 2 | 1.5 | Active |
|   |   | 1 | 4.3 | Standby |
|   |   | 2 | 1.5 | Active |
| B | N+1 | 4 | 1.5 | Active |
|   |   | 3 | 2.8 | Active |
|   |   | 1 | 4.3 | Standby |

SELECTING ACTIVE POWER SUPPLIES BASED ON POWER SUPPLY CABLE LENGTH

BACKGROUND

Field of the Invention

The present invention relates to managing the use of redundant power supplies to reduce power consumption.

Background of the Related Art

The amount of power consumed by the equipment in a modern datacenters represents a significant expense, even in relation to the cost of the equipment itself. A modern datacenter may include as many as tens of hundreds of high-power, rack-mounted servers disposed in high-density enclosures. Management of the power consumed by this equipment is an important consideration in the design and operation of any datacenter.

Attempts to reduce or optimize power consumption may be multifaceted. For example, power consumption may be reduced by improving datacenter layout and selecting appropriate components for use in the datacenter. Furthermore, the design of individual components can affect the overall efficiency of a server or other device. Power management solutions may include both hardware and software aspects aimed at improving various aspects of power utilization, allocation, and load scheduling.

BRIEF SUMMARY

One embodiment of the present invention provides a method, comprising identifying a plurality of power supplies connected for supplying power to a computer system, wherein the plurality of power supplies includes at least one redundant power supply in a standby mode, and, for each of the plurality of power supplies identified, determining a length of a power supply cable connected between the power supply and a power distribution unit for supplying power to the power supply. The method further comprises placing one or more of the plurality of power supplies in an active mode in ascending order of the length of the cable connected to the power supply, and supplying power to the computer system using the one or more of the plurality of power supplies in the active mode.

Another embodiment of the present invention provides a computer program product comprising a non-transitory computer readable storage medium having program instructions embodied therewith, where the program instructions are executable by a processor to cause the processor to perform a method. The method comprises identifying a plurality of power supplies connected for supplying power to a computer system, wherein the plurality of power supplies includes at least one redundant power supply in a standby mode, and, for each of the plurality of power supplies identified, determining a length of a power supply cable connected between the power supply and a power distribution unit for supplying power to the power supply. The method further comprises placing one or more of the plurality of power supplies in an active mode in ascending order of the length of the cable connected to the power supply, and supplying power to the computer system using the one or more of the plurality of power supplies in the active mode.

BRIEF DESCRIPTION OF THE SEVERAL VIEWS OF THE DRAWINGS

FIG. 4 is a table illustrating how the power supply mode for each power supply is determined as a function of the length of cables connecting each power supply to a power source and the redundancy configuration of the power supplies.

DETAILED DESCRIPTION

Figure 1:
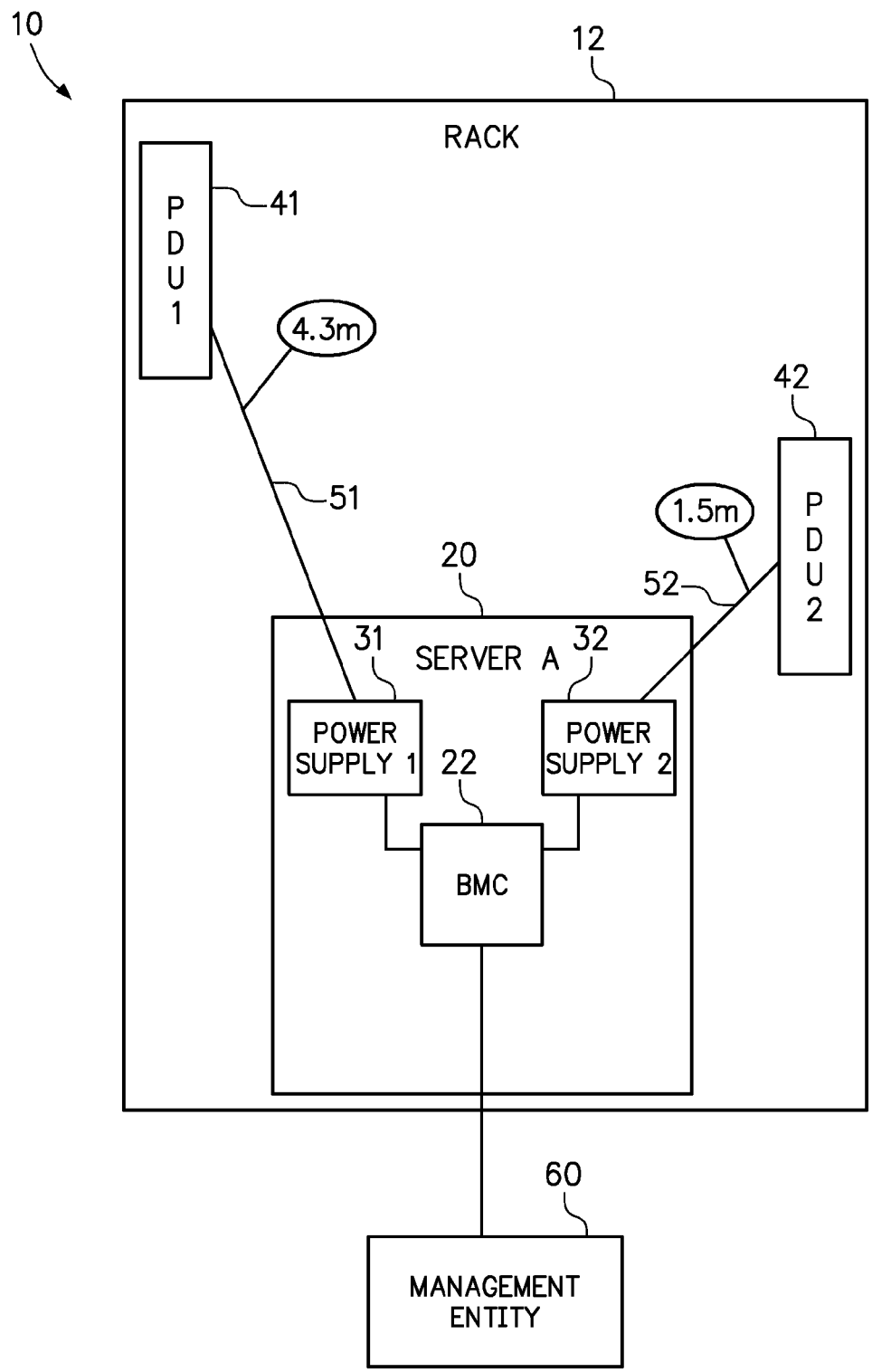
FIG. 1 is a diagram of a power distribution system including a first server having two power supplies configured in an N+N configuration.

One embodiment of the present invention provides a method, comprising identifying a plurality of power supplies connected for supplying power to a computer system, wherein the plurality of power supplies includes at least one redundant power supply in a standby mode, and, for each of the plurality of power supplies identified, determining a length of a power supply cable connected between the power supply and a power distribution unit for supplying power to the power supply. The method further comprises placing one or more of the plurality of power supplies in an active mode in ascending order of the length of the cable connected to the power supply, and supplying power to the computer system using the one or more of the plurality of power supplies in the active mode.

The plurality of power supplies are preferably included within, or directed secured to, a housing that also includes the computer system. For example, the power supplies may be in the form of modules that are easily plugged into the housing to facilitate replacement in the event of a failed power supply. The computer system may be a single node, such as a server or a switch, or multiple nodes secured in a multi-node chassis. One example of a multi-node chassis is a blade server chassis having multiple bays for receiving blade servers, switches, power supplies, a management module, and the like. In the blade server chassis, the power supplies distribute power to all of the blade servers rather than having any one power supply dedicated to any one of the blade servers.

Embodiments of the present invention are applicable to computer systems having any level of power supply redundancy. Non-limiting examples of power supply redundancy may include N+1, N+2, N+N (i.e., full or complete redundancy), 2N+1, where N is the number of power supplies needed to provide full power to the computer system. The level of redundancy may be selected giving consideration to the how critical it is to keep the system running at all times. For example, a computer system with N+1 power supplies would typically have N active power supplies and one power supply in standby. Accordingly, the computer system can continue running when any one of the power supplies fails, but would have less than full power if two power supplies failed. As another example, a computer system with N+N power supplies would typically have N active power supplies and N power supplies in standby, such the computer system could continue running at full power on N power supplies even after another N power supplies failed. When an active power supply fails, a power supply that was in standby is automatically placed in the active state. Preferably, the standby power supply (i.e., redundant power supply) becomes active without causing the computer system to shutdown or experience an interruption.

Each power supply must be connected to a power source. Large computer systems such as datacenters use racks for securing, supporting and organizing large numbers of nodes in an efficient arrangement. Accordingly, each of the plurality of power supplies may be connected to a power distribution unit (PDU) with a power supply cable. A typical rack may include several power distributions units in order to enable connection with each of the power supply cables. Furthermore, a desire for redundancy among the power distribution units may suggest that the power supplies to a computer system should each be connected to a different power distribution unit. Accordingly, it is often the case that one power supply cable may be connected to an immediately adjacent power distribution unit, whereas another power supply cable may be connected to a power distribution unit in a remote location within the rack. Accordingly, there may be significant variation in the length of the power supply cables that supply power to the power supplies providing power to a given node or group of nodes.

Embodiments of the present invention include, for each of the plurality of power supplies identified, determining a length of a power supply cable connected between the power supply and a power distribution unit for supplying power to the power supply. The length of a power supply cable may be determined using any one or more of variety of manners. For example, the length of each cable may be stored in a table accessible to a workload management application running on the computer system or accessible to a workload management application running on a remote management entity. In an alternative example, the length of each cable may be determined by reading vital product data stored on an EEPROM attached to the cable. In yet another example, the length of each cable is determined (i.e., estimated) by measuring a distance between the computer system and the power distribution unit to which the cable is connected. In a still further example, a voltage drop across the length of each power supply cable may be measured and the cable length may be determined as being proportional to the measured voltage drop.

In one example, two cables have different lengths are shown to have different voltage drops across the lengths of the cables. Each cable was modeled as having a power source supplying 115 V, AC single phase (60 Hz), and a load current of 30 Amperes. Furthermore, each cable was modeled as having a 12 awg (American Wire Gauge) copper conductor. A first cable having a length of 10 feet was determined to have a voltage drop of 0.3% and a second cable having a length of 200 feet was determined to have a voltage drop of 6.1%.

The lengths of power supply cables connected to the power supplies of a given computer system may be stored by the local baseboard management controller of that same computer system. Alternatively, each computer system may report the lengths of power supply cables connected to the power supplies of that computer system to a separate management entity. In either case, the cable length data may be stored along with additional information about the power supply configuration, such as the level of redundancy, an identification of each power supply, and an indication of whether each power supply is in active mode or in standby.

Embodiments of the present invention may then place one or more of the plurality of power supplies in an active mode in ascending order of the length of the cable connected to the power supply, and supply power to the computer system using the one or more of the plurality of power supplies in the active mode. An ascending order of cable length means that the power supply cables connected to the power supplies of a given computer system are considered in order from the shortest cable to the longest cable. Accordingly, a first power supply with the shortest power supply cable is placed in an active mode. If the first power supply can satisfy the load of the computer system, then the other power supplies of the computer system may remain in standby. However, if a computer system includes four power supplies in an N+1 configuration, then up to three power supplies may be placed in active mode if the computer system has sufficient demand for power. In accordance with embodiments of the present invention, of the power supplies of a computer system that are available and have not failed, the one or more active power supplies will have the shortest cables and the one or more standby power supplies will have the longest cables. If the event that two or more power supplies of a computer system have cables with the same length, then any one of those power supplies may be placed in active mode before the other power supplies with the same length of cable.

In another embodiment, the active power supplies may have a greater total power capacity than the amount of power being used by the computer system, yet none of the active power supplies can be placed in standby without the total power capacity being less than the amount of power being used by the computer system. In this situation, the load may be distributed across the active power supplies in a manner such that an amount of the load on each active power supply decreases with ascending order of the length of the cable connected to each power supply. In other words, the active power supply with the shortest power supply cable will supply a greater amount of power than will another active power supply having a longer power supply cable. In a further option, the load may be distributed across the active power supplies such that an amount of the load on each active power supply is inversely proportional to the length of the cable connected to each power supply.

In a specific example of a load distributed across the active power supplies based on the cable length, a computer system may need 750 W from two 500 W power supplies. Accordingly, the method may supply 500 W from a first power supply identified as having a shorter power supply cable than a second power supply, and then supply the other 250 W from the second power supply. Optionally, the method may also consider the efficiency of the power supplies themselves in determining how much load to place on a given power supply. For example, if the power supplies suffer a large inefficiency above 95% of their rated capacity, then even if a given power supply has the shortest power supply cable, than power supply may be controlled to supply only 95% of its rated capacity. Accordingly, power supply cable length may be only one factor is determining which power supplies to be active and how much power to supply from each active power supply. Optionally, the BMC or other management entity may, over separate periods of time, monitor the efficiency of a first group of one or more power supplies (PSn) and the efficiency of a second group of one or more power supplies (PSn+x) and then confirm that the group of active power supplies is more efficient than other possible groupings of the power supplies connected to the computer system.

Various aspects of the present invention may be implemented using one or more baseboard management controller (BMC) of the computer system, an in-band management entity of the computer system, or a separate management entity in communication with the BMC or in-band management entity of the computer system. The BMC is a local out-of-band entity, whereas the in-band management entity may be an application running on the operating system of the computer system. The BMC may control whether each power supply is in an active mode or a standby mode, and the determination of which one or more power supplies should be active may be made by the BMC, an in-band management entity of the computer system, or a separate management entity.

Another embodiment of the present invention provides a computer program product comprising a non-transitory computer readable storage medium having program instructions embodied therewith, where the program instructions are executable by a processor to cause the processor to perform a method. The method comprises identifying a plurality of power supplies connected for supplying power to a computer system, wherein the plurality of power supplies includes at least one redundant power supply in a standby mode, and, for each of the plurality of power supplies identified, determining a length of a power supply cable connected between the power supply and a power distribution unit for supplying power to the power supply. The method further comprises placing one or more of the plurality of power supplies in an active mode in ascending order of the length of the cable connected to the power supply, and supplying power to the computer system using the one or more of the plurality of power supplies in the active mode.

The foregoing computer program products may further include computer readable program code for implementing or initiating any one or more aspects of the methods described herein. Accordingly, a separate description of the methods will not be duplicated in the context of a computer program product.

FIG. 1 is a diagram of a power distribution system 10 including a first server 20 (Server A) having two power supplies 31, 32 (Power Supply 1 and Power Supply 2) configured in an N+N configuration. Accordingly, the BMC 22 may cause one of the two power supplies 31, 32 to be active and the other of the two power supplies 31, 32 to be in standby. The server 20 is in a rack 12 along with two power distribution units 41, 42 (PDU 1 and PDU 2) in different locations within the rack 12, such that the two power supply cables 51, 52 have different cable lengths. Specifically, a first power supply cable 51 connecting the first power supply 31 to the first power distribution unit 41 has a length of 4.3 meters and a second power supply cable 52 connecting the second power supply 32 to the second power distribution unit 42 has a length of 1.5 meters. In accordance with the present invention, the second power supply 32 (Power Supply 2) is automatically selected to be active because cable 52 is shorter than cable 51. An optional management entity 60 is in communication with the BMC 22 of the server 20. Either the BMC 22 or the management entity 60 may store cable length data and determine which of the power supplies are to be active.

Figure 2:
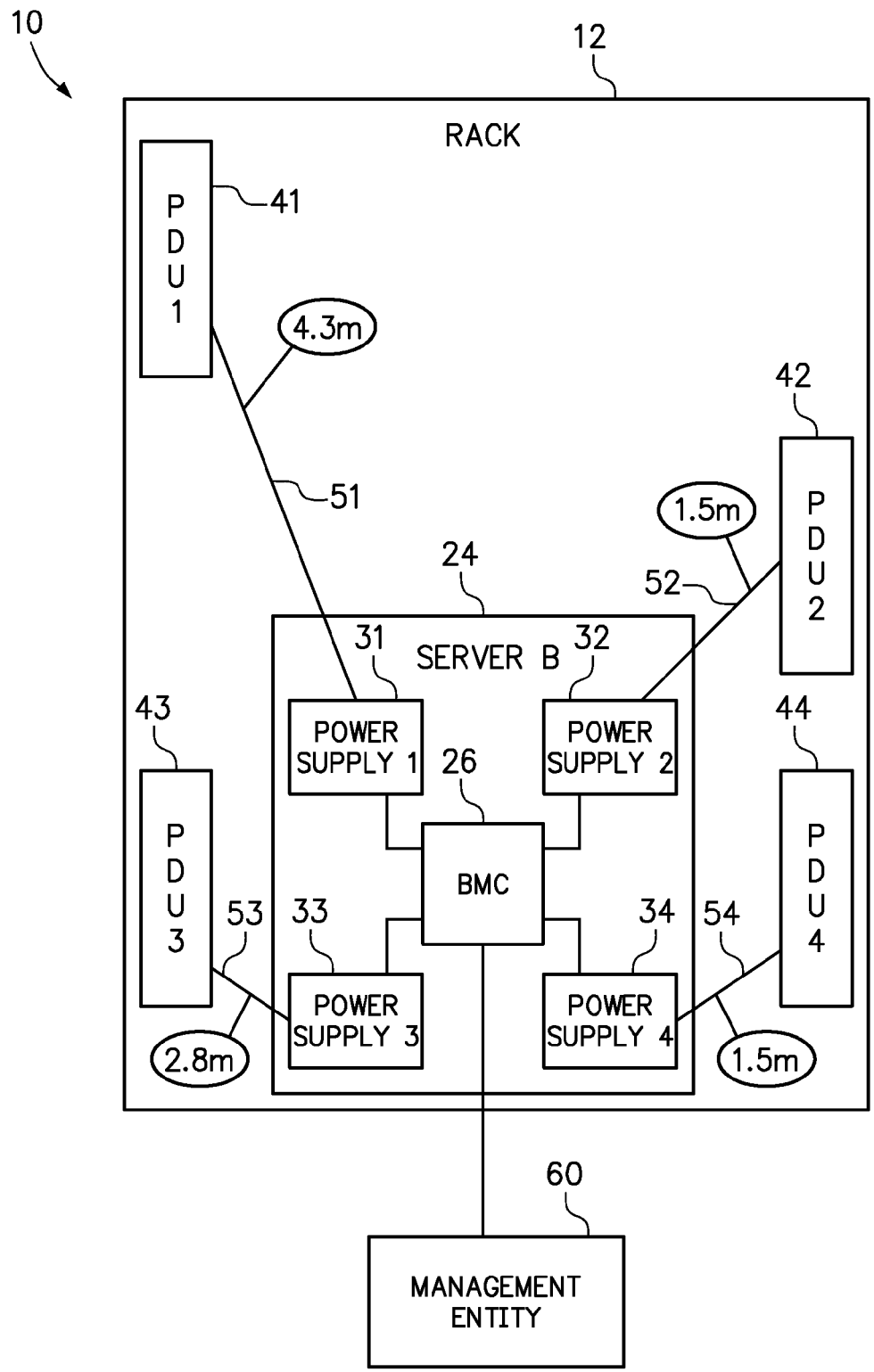
FIG. 2 is a diagram of a power distribution system including a second server having four power supplies configured in an N+1 configuration.

FIG. 2 is a diagram of the power distribution system 10 including a second server 24 having four power supplies 31, 32, 33, 34 (Power Supply 1, Power Supply 2, Power Supply 3, Power Supply 4) configured in an N+1 configuration. Accordingly, the BMC 26 may cause three of the four power supplies 31, 32, 33, 34 to be active and one of the four power supplies 31, 32, 33, 34 to be in standby. The server 24 is in the rack 12 along with four power distribution units 41, 42, 43, 44 (PDU 1, PDU 2, PDU 3, PDU 4) in different locations within the rack 12, such that the four power supplies 31, 32, 33, 34 have different cable lengths. Specifically, a first power supply cable 51 connecting the first power supply 31 to the first power distribution unit 41 has a length of 4.3 meters, a second power supply cable 52 connecting the second power supply 32 to the second power distribution unit 42 has a length of 1.5 meters, a third power supply cable 53 connecting the third power supply 33 to the third power distribution unit 43 has a length of 2.8 meters, and a fourth power supply cable 54 connecting the fourth power supply 34 to the fourth power distribution unit 44 has a length of 1.5 meters. In accordance with the present invention, the second, third and fourth power supplies 32, 33, 34 are automatically selected to be active because their cables 52, 53, 54 are shorter than the first cable 51.

Figure 3:
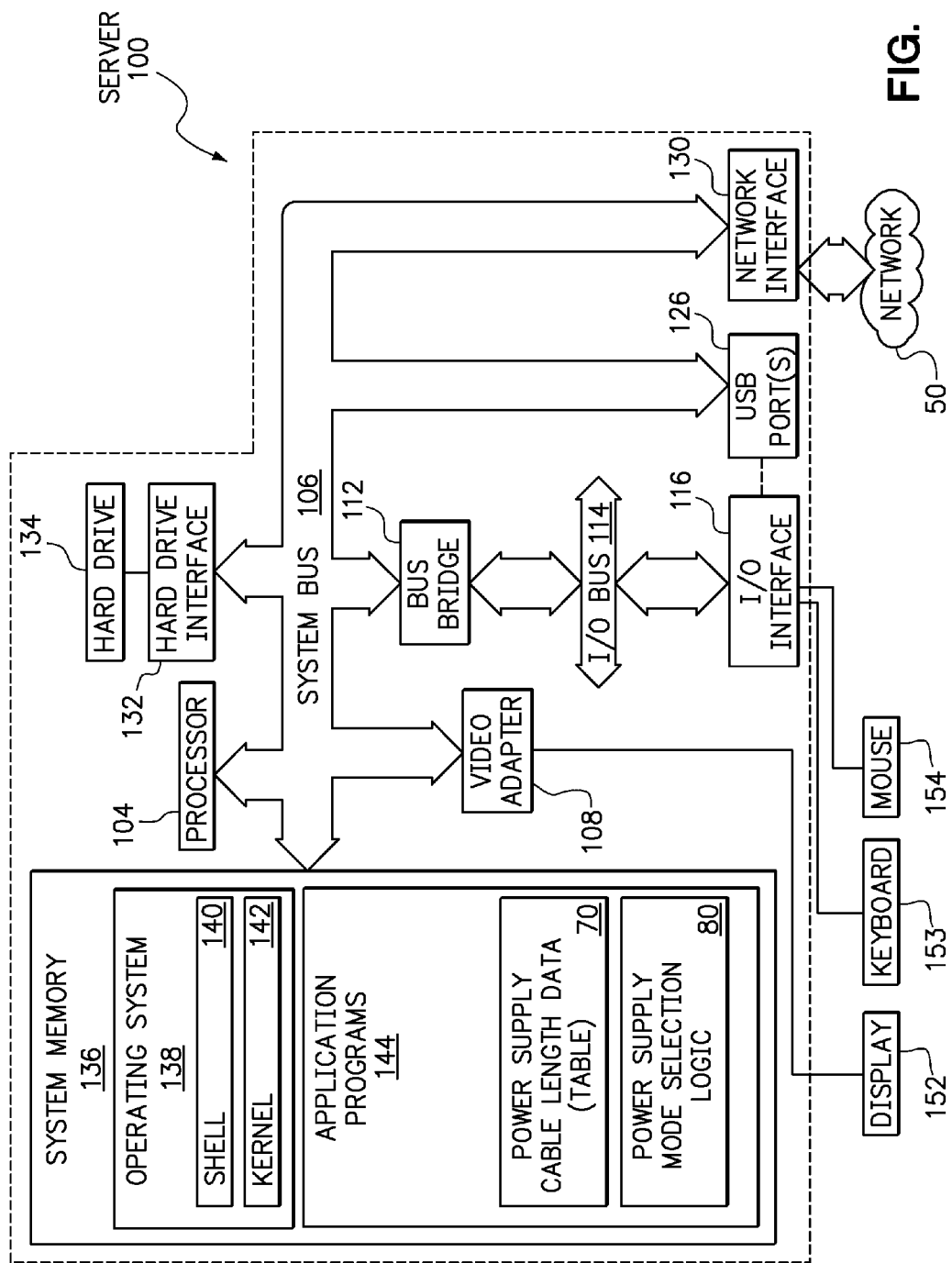
FIG. 3 is a diagram of a computer according to one embodiment of the present invention.

FIG. 3 is a diagram of an exemplary server 100 that may represent the computer system 20, 24 (i.e., server) or the management entity 60 in accordance with various embodiments of the present invention. The computer 100 includes a processor unit 104 that is coupled to a system bus 106. Processor unit 104 may utilize one or more processors, each of which has one or more processor cores. A video adapter 108, which drives/supports a display 152, is also coupled to system bus 106. The system bus 106 is coupled via a bus bridge 112 to an input/output (I/O) bus 114. An I/O interface 116 is coupled to I/O bus 114. The I/O interface 116 affords communication with various I/O devices, including a keyboard 153, and a mouse 154. The I/O devices may optionally include storage devices, such as CD-ROM drives and multimedia interfaces, other printers, and external USB port(s). While the format of the ports connected to I/O interface 116 may be any known to those skilled in the art of computer architecture, in a preferred embodiment some or all of these ports are universal serial bus (USB) ports. As depicted, the computer 100 is able to communicate over the network 50 using a network interface 130. The network 50 may be an external network, such as the global communication network, and perhaps also an internal network such as an Ethernet LAN or a virtual private network (VPN).

A hard drive interface 132 is also coupled to system bus 106 and interfaces with a hard drive 134. In a preferred embodiment, the hard drive 134 populates a system memory 136, which is also coupled to system bus 106. System memory is defined as a lowest level of volatile memory in the computer 100. This volatile memory may include additional higher levels of volatile memory (not shown), including, but not limited to, cache memory, registers and buffers. Data that may populate the system memory 136 includes the computer's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, the OS 138 also includes a kernel 142, which includes lower levels of functionality for OS 138, including providing essential services required by other parts of OS 138 and application programs 144, including memory management, process and task management, disk management, and mouse and keyboard management. The application programs 144 in the system memory of the computer 100 may include various programs and modules for implementing the methods described herein, such as power supply cable length data (table) 70 and power supply mode selection logic 80.

The hardware elements depicted in computer 100 are not intended to be exhaustive, but rather are representative components suitable to perform the processes of the present invention. For instance, computer 100 may include alternate memory storage devices such as magnetic cassettes, digital versatile disks (DVDs), Bernoulli cartridges, and the like. These and other variations are intended to be within the spirit and scope of the present invention.

It should be recognized that, as described herein, the power supply cable length data (table) 70 and the power supply mode selection logic 80 may alternatively be stored and executed by the baseboard management controller 22 of FIG. 1 or the baseboard management controller 26 of FIG. 2.

FIG. 4 is a table 70 illustrating power supply cable length data that may be obtained and used in accordance with various embodiments of the present invention. As shown, the table 70 includes data for the computer system 20 (Server A) in FIG. 1 and the computer system 24 (Server B) in FIG. 2. Accordingly, the first column 71 identifies the two computer systems 20, 24, the second column 72 identifies the power supply redundancy configuration for each system, and the third column 73 identifies the power supplies that supply power to each system. The cable length (in meters) of the cable connected to one of the power supplies is identified in the fourth column 74. As shown, the lengths of the cables (column 74) and the associated power supply ID (column 73) have been sorted into ascending order (i.e., ascending down the column).

Since computer system A (Server A) is in an N+N configuration with two power supplies, only one power supply will be active and the other power supply will be in standby. As shown in the fifth column 75, the power supply mode for Power Supply 2 is "active" and the power supply mode for Power Supply 1 is "standby" because the cable length associated with Power Supply 2 is shorter (i.e., 1.5 meters) than the cable length associated with Power Supply 1 (i.e., 4.3 meters).

Computer system B (Server B) is in an N+1 configuration with four power supplies, such that three power supplies may be active and one power supply will be in standby. As shown in the fifth column 75, the power supply mode for Power Supply 2, Power Supply 4 and Power Supply 3 is "active" and the power supply mode for Power Supply 1 is "standby" because the cable lengths associated with Power Supply 2, Power Supply 4 and Power Supply 3 are shorter (i.e., 1.5 meters, 1.5 meters and 2.8 meters) than the cable length associated with Power Supply 1 (i.e., 4.3 meters).

Figure 5:
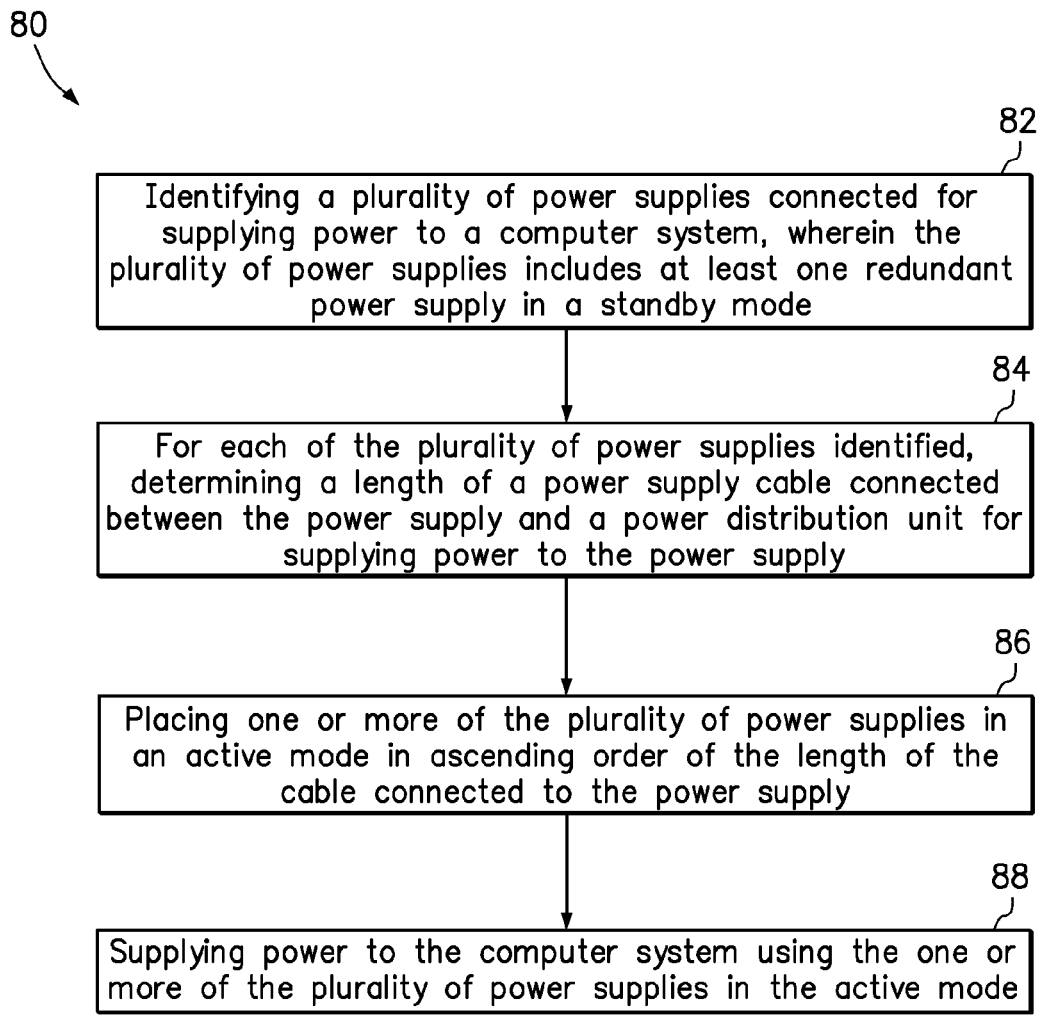
FIG. 5 is a flowchart of a method in accordance with one embodiment of the present invention.

FIG. 5 is a flowchart of a method 80 in accordance with one embodiment of the present invention. Step 82 includes identifying a plurality of power supplies connected for supplying power to a computer system, wherein the plurality of power supplies includes at least one redundant power supply in a standby mode. Step 84 includes, for each of the plurality of power supplies identified, determining a length of a power supply cable connected between the power supply and a power distribution unit for supplying power to the power supply. Step 86 includes placing one or more of the plurality of power supplies in an active mode in ascending order of the length of the cable connected to the power supply. Step 88 then includes supplying power to the computer system using the one or more of the plurality of power supplies in the active mode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   identifying a plurality of power supplies connected for supplying power to a computer system, wherein the plurality of power supplies includes at least one redundant power supply in a standby mode;
   for each of the plurality of power supplies identified, determining a length of a power supply cable connected between the power supply and one of a plurality of power distribution units for supplying power to the power supply;
   placing one or more of the plurality of power supplies in an active mode in ascending order of the length of the cable connected to the power supply; and
   supplying power to the computer system using the one or more of the plurality of power supplies in the active mode.

2. The method of claim 1, further comprising:
   identifying the level of power supply redundancy to the system.

3. The method of claim 2, wherein the level of power supply redundancy is identified as complete redundancy and there is one inactive power supply for each active power supply.

4. The method of claim 1, wherein the computer system is a single compute node.

5. The method of claim 4, wherein the single compute node is a server.

6. The method of claim 1, wherein the computer system includes multiple nodes.

7. The method of claim 1, wherein the plurality of power supplies provides N+1 redundancy, wherein a number N of the power supplies are designated as an active power supply and one of the power supplies is in a standby mode.

8. The method of claim 1, wherein the plurality of power supplies provides N+N redundancy, wherein a first set of a number N of the power supplies are designated as an active power supply, and wherein a second set of a number N of the power supplies are in a standby mode.

9. The method of claim 1, wherein the length of each cable is stored in a table accessible to a workload management application running on the computer system.

10. The method of claim 1, wherein the length of each cable is stored in a table accessible to a workload management application running on a remote management entity.

11. The method of claim 1, wherein the length of each cable is determined by reading vital product data stored on an EEPROM attached to the cable.

12. The method of claim 1, wherein the length of each cable is determined by measuring a distance between the computer system and the power distribution unit to which the cable is connected.

13. The method of claim 1, further comprising:
distributing a load across the active power supplies, wherein an amount of the load on each active power supply decreases with ascending order of the length of the cable connected to each power supply.

14. The method of claim 1, further comprising:
distributing a load across the active power supplies, wherein an amount of the load on each active power supply is inversely proportional to the length of the cable connected to each power supply.

15. The method of claim 1, further comprising:
a baseboard management controller controlling whether each power supply is active or in standby.

16. The method of claim 1, further comprising:
measuring a voltage drop across the length of each power supply cable, and determining cable length as proportional to the measured voltage drop.

17. A computer program product comprising a non-transitory computer readable storage medium having program instructions embodied therewith, the program instructions executable by a processor to cause the processor to perform a method comprising:
identifying a plurality of power supplies connected for supplying power to a computer system, wherein the plurality of power supplies includes at least one redundant power supply in a standby mode;
for each of the plurality of power supplies identified, determining a length of a power supply cable connected between the power supply and one of a plurality of power distribution units for supplying power to the power supply;
placing one or more of the plurality of power supplies in an active mode in ascending order of the length of the cable connected to the power supply; and
supplying power to the computer system using the one or more of the plurality of power supplies in the active mode.

18. The computer program product of claim 17, the method further comprising:
distributing a load across the active power supplies, wherein an amount of the load on each active power supply decreases with ascending order of the length of the cable connected to each power supply.

19. The computer program product of claim 17, the method further comprising:
distributing a load across the active power supplies, wherein an amount of the load on each active power supply is inversely proportional to the length of the cable connected to each power supply.

20. The computer program product of claim 17, the method further comprising:
a baseboard management controller controlling whether each power supply is active or in standby.

* * * * *